Dec. 23, 1952 J. H. HAMMOND, JR 2,623,117

TELEVISION TYPE FACSIMILE RECEIVING SYSTEM

Filed Dec. 11, 1948 3 Sheets-Sheet 1

Inventor
JOHN HAYS HAMMOND, JR.

By [signature]

Attorney

Dec. 23, 1952 J. H. HAMMOND, JR 2,623,117

TELEVISION TYPE FACSIMILE RECEIVING SYSTEM

Filed Dec. 11, 1948 3 Sheets-Sheet 2

Inventor
JOHN HAYS HAMMOND, JR.

By

Attorney

Inventor
JOHN HAYS HAMMOND, JR.
By
Attorney

Patented Dec. 23, 1952 2,623,117

UNITED STATES PATENT OFFICE 2,623,117

TELEVISION TYPE FACSIMILE RECEIVING SYSTEM

John Hays Hammond, Jr., Gloucester, Mass.

Application December 11, 1948, Serial No. 64,809

4 Claims. (Cl. 178—7.4)

This invention relates to television and more specifically to a system for transmitting news on any desired schedule.

The invention comprises means in connection with a standard television system for scanning and transmitting a news sheet and transmitting a characteristic control signal which operates means at the receiver causing the news sheet to be photographed when it appears on the receiver kinescope tube, subsequent to which the film is processed and produces a printed sheet which is fed out through a slot in the side of the cabinet and may be torn off and used as a news sheet.

The invention also provides for mounting the photographic and control apparatus in a separate cabinet, on which a standard television receiver is mounted, and which is provided with a movable mirror system forming an optical path between the television screen and the camera.

The invention also consists in certain new and original features of construction and combinations of parts hereinafter set forth and claimed.

Figure 1:
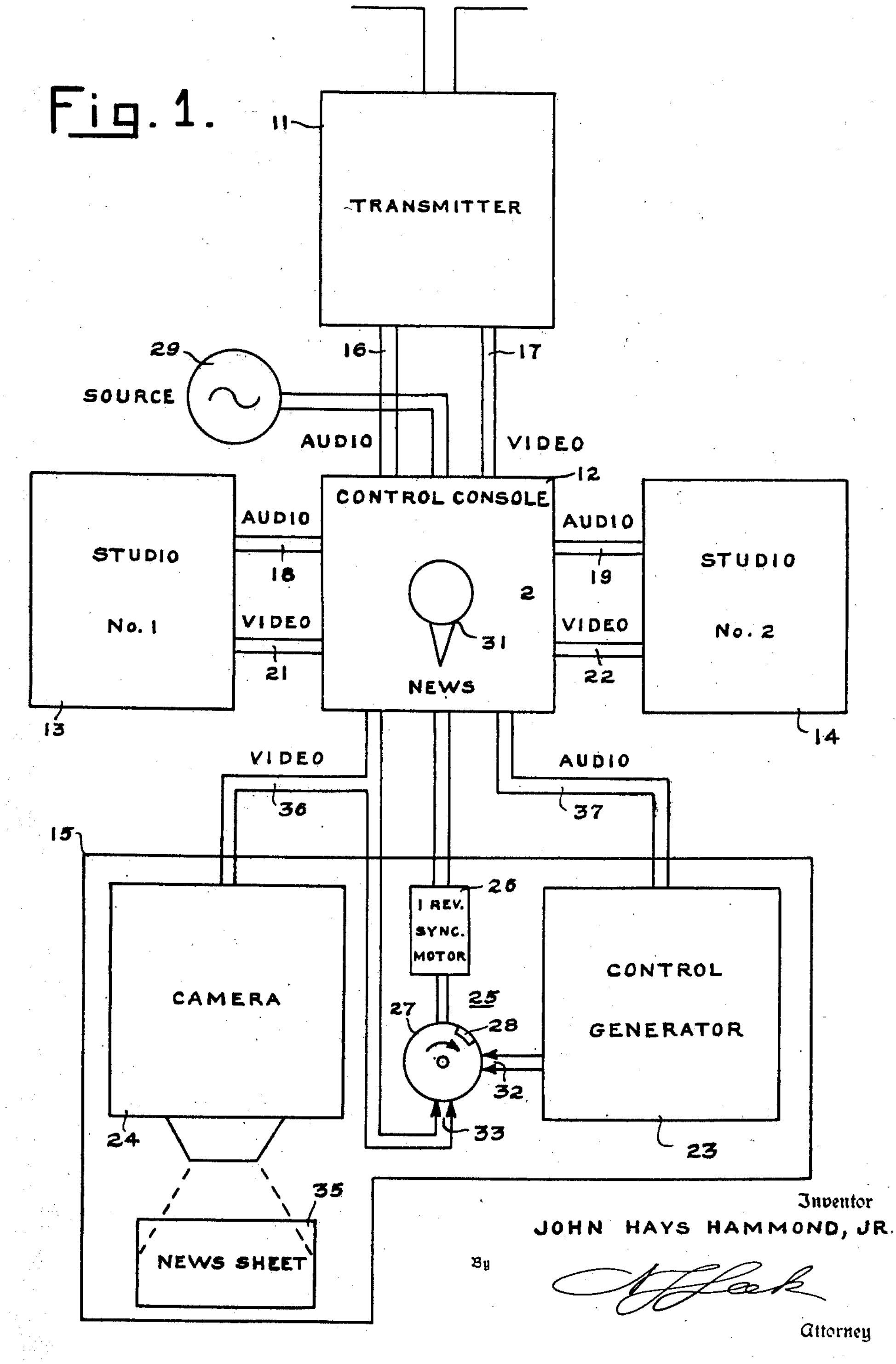
Figure 2:
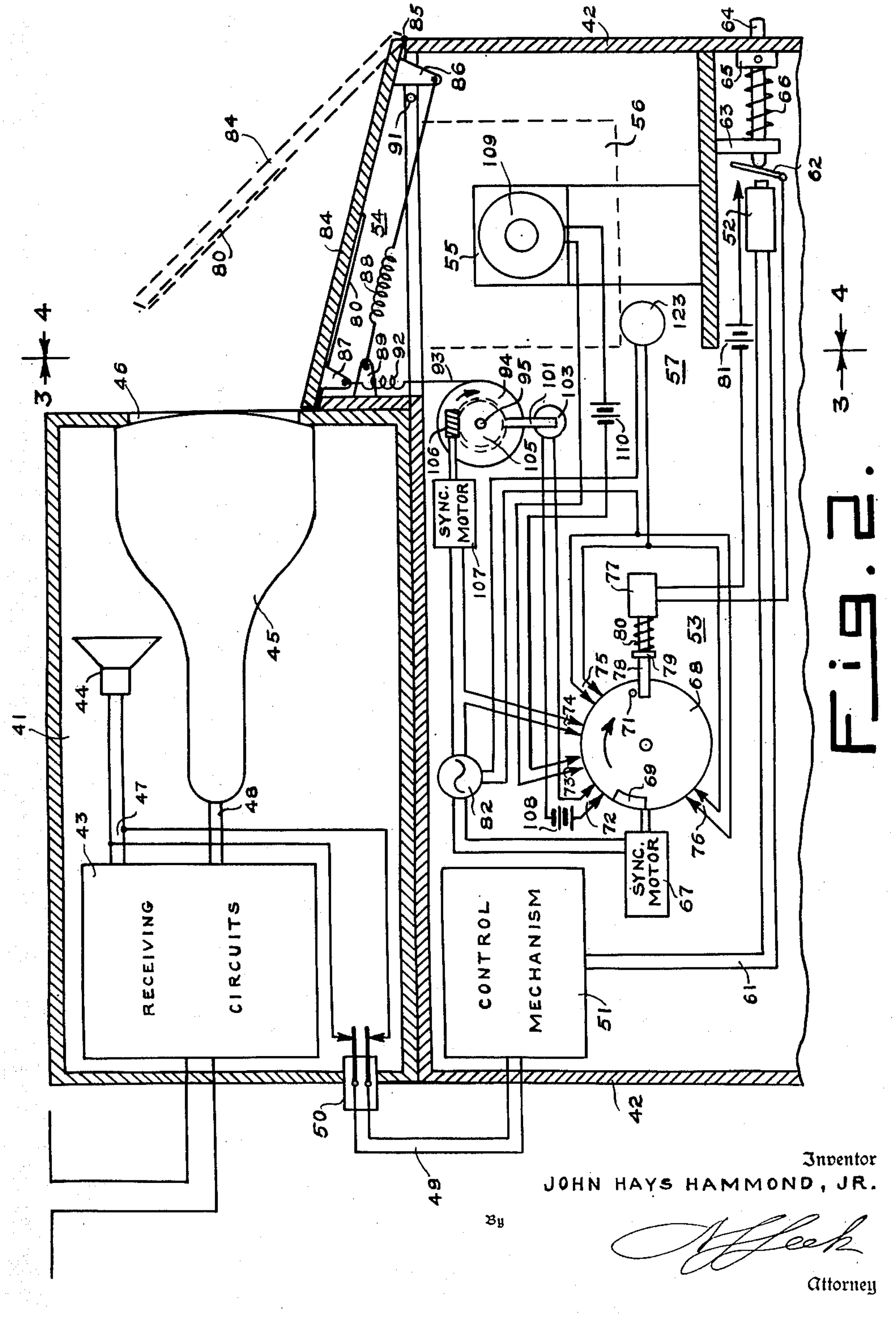
Figure 3:
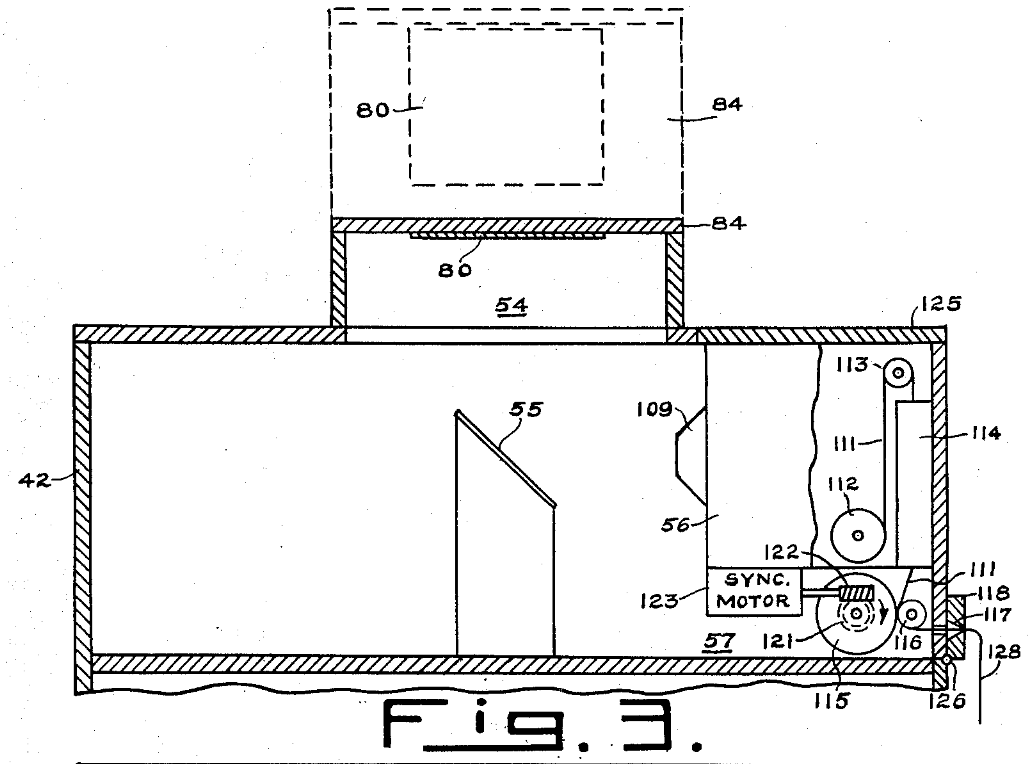
Figure 4:
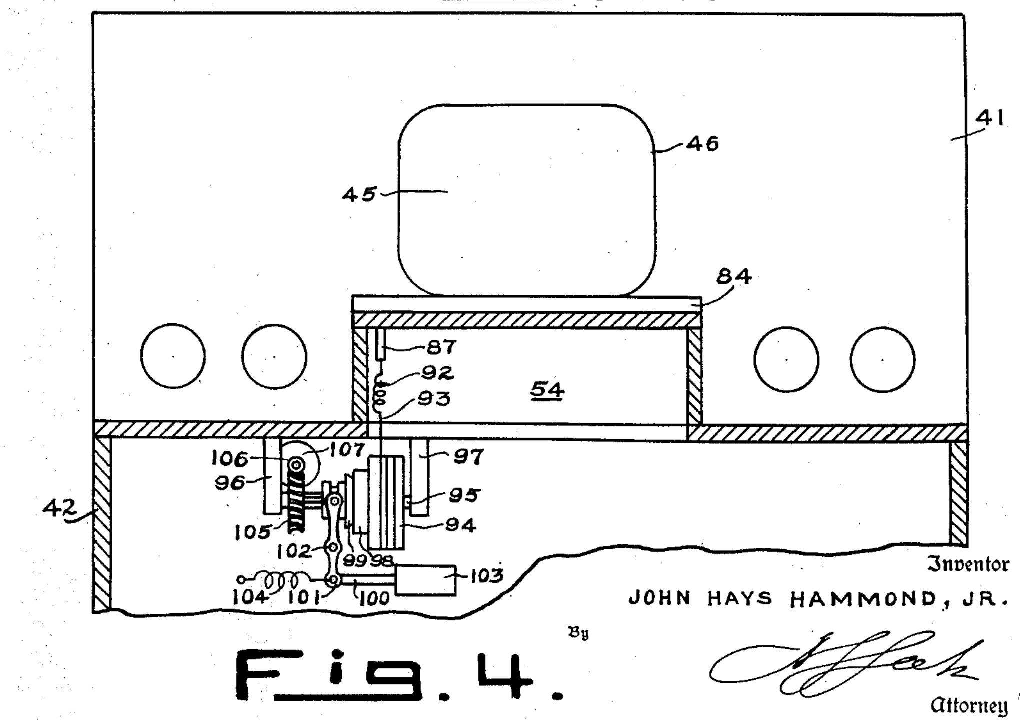

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Fig. 1 is a diagrammatic view of a television transmitting system constructed in accordance with the invention, Fig. 2 is a diagrammatic view of a television receiving system used in connection with the transmitting system shown in Fig. 1, Fig. 3 is a section through the cabinet taken on line 3—3 of Fig. 2, and looking in the direction of the arrows 3—3, and Fig. 4 is a section taken on line 4—4 of Fig. 2 and looking in the direction of the arrows 4—4.

Like reference characters denote like parts in the several figures of the drawing.

In the following description parts will be identified by specific names for convenience, but they are intended to be generic in their application to similar parts.

Referring to the drawings and more particularly to Fig. 1, the transmitting system consists of a standard television transmitter 11, a control console 12, two studios 13 and 14 and a news room 15. The control console is connected to the transmitter 11 by an audio channel 16 and a video channel 17, to the two studios 13 and 14 by two audio channels 18 and 19 and two video channels 21 and 22 respectively.

The standard television transmitter 11 includes everything necessary to take audio and video signals from lines 16 and 17 and deliver corresponding radio signals for transmission. It could include, for example, an RCA-Type TT-5A television transmitter described in sheet T.61 of August 1947 in "Engineering Products Catalog," Radio Corporation of America, Engineering Products Department, Camden, New Jersey; an RCA-MI-19104 Vestigial Side Band Filter described on sheet T.69; and an RCA-Type TG-1A Television Synchronizing Generator described in separate folder Form LJ 1052.

The studios designated by reference characters 13 and 14 may be of the type discussed in the RCA Review, December 1947, "Technical aspects of television studio operation" by R. W. Clark and H. C. Gronberg. The construction of studios is discussed by G. M. Nixon in an article "Planning radio and television studios," Broadcast News, December 1948. A minimum of equipment in each studio 13 and 14 may be, for example, an RCA Velocity Microphone, Type 49-BX, described in Section S, .261 of the above referred to catalog; an RCA Remote Pickup-Amplifier Type OP-6, Section S. 3188; and an RCA Type TK-10A Studio Camera Equipment, separate folder, Form LJ 3125.

In its minimum aspects, the control console can comprise a three gang three position rotary switch, such, for example, as the Mallory Type 1313L, listed on page L-2 of the thirteenth edition of "Radio Master," published in 1948 by United Catalog Publisher, Inc. One section of the switch can control the flow of audio energy through the console, another can control the flow of video energy, and a third can control the flow of A. C. energy to the motor 26.

A discussion of equipment indicated by reference characters 11, 12, 13, and 14 suitable for practicing the present invention is to be found in "Broadcast News," Number 52, December 1948.

The news room 15 comprises a control generator 23, a television camera 24 and a timing mechanism 25. The timing mechanism 25 consists of a self-starting synchronous motor 26, on the shaft of which is mounted a commutator 27 which is made of insulating material and is provided with a contact segment 28. A 60 cycle or other suitable A. C. generator 29 is provided which is connected through the control console 12 to the motor 26 in such a way that when the control console indicator 31 is turned to "News" the motor 26 will cause the commutator 27 to make one complete revolution in a clockwise direction and come to rest in its initial position. The motor 26 contains suitable internal gearing for speed reduction purposes, and suitable mechanisms for causing it to start and to stop when the shaft is positioned properly with respect to the contact segment 28. Engaging the commutator 27 are two sets of contacts 32 and 33, the former being connected to the control generator 23 and the latter being connected in the video output circuit 36 of the camera 24 which is connected to the control console. A news sheet 35 is shown as placed in position to be viewed by the camera 24. The control generator 23 is connected to the control console 12 by an audio channel 37.

The television camera 24 may be identical with the camera RCA Type TK-10A mentioned above.

A synchronous motor suitable for the purpose of this invention as the motor 26 is described in Bulletin 10D of the R. W. Cramer Co., Centerbrook, Conn.

A control generator suitable for the purpose of this invention as the control generator 23 is described in General Radio Catalog J, page 68 and is designated therein as the General Radio Type 813 Audio Oscillator.

Referring to Fig. 2 the receiving system comprises a standard television receiver 41 which is mounted on a cabinet 42. The television receiver 41 includes the usual receiving circuits 43, a loud speaker 44 and a kinescope 45 which is viewed through an opening 46 in the receiver casing. The receiving circuits 43 are connected to the loud speaker 44 by an audio channel 47 and to the kinescope 45 by a video channel 48.

Suitable receiving circuits to serve as the receiving circuits may be found in a paper "Television Receivers" by Antony Wright in the RCA Review, March 1947, pages 5 to 28.

Mounted in the cabinet 42 is a control mechanism 51, a relay 52, a timing mechanism 53, a movable mirror system 54, a fixed mirror 55, a camera 56 and a feeding mechanism 57. The control mechanism 51 includes a filter selector system, an amplifier and rectifier. The input circuit of the control mechanism 51 is connected by flexible leads 49 to a plug 50 which is inserted in the receiver 41 and connects to the audio channel 47.

The control mechanism 51 delivers D. C. power to the line 61 in response to energy of audio frequency generated by the control generator 23 of Fig. 1 and applied on the line 49. Fig. 7 of U. S. Patent No. 1,522,883 shows typical circuits suitable for this purpose.

The output circuit of the control mechanism 51 is connected by conductors 61 to the winding of the relay 52 which is provided with an armature 62. Slidably mounted in a bracket 63 and the front of the cabinet 42 is a rod 64 to which is secured a collar 65. Between the collar 65 and the bracket 63 is mounted a compression spring 66. When pushed in, the rod 64 engages the armature 62 closing the relay 52.

The timing mechanism 53 comprises a self starting synchronous motor 67 on the shaft of which is mounted a commutator 68 made of insulating material and provided with a contact segment 69 and a pin 71. Engaging the commutator 68 are five sets of contacts 72–76. Located adjacent to the commutator 68 is a solenoid 77, provided with a core 78 which when extended engages the pin 71. Secured to the core 78 is a collar 79 between which and the solenoid 77 is mounted a coil spring 80. The winding of the solenoid 77 is connected in a circuit including a battery 81 and the contacts of the relay 52. The synchronous motor 67 is supplied with current from a suitable A. C. source 82.

The mirror system 54 includes an inclined cover 84 which is hinged at 85 to the casing of the cabinet 42. Secured to the under surface of the cover 84 is a plane mirror 80 and two arms 86 and 87. Attached to the arm 86 is one end of a tension spring 88 the other end of which is attached to an arm 89 mounted on the casing of the cabinet 42. A pin 91 is secured to the casing of the cabinet 42 and acts as a stop for the arm 86 when the cover 84 is in the open position, as indicated by dotted lines.

Attached to the arm 87 is one end of a tension spring 92 the other end of which is attached to a cable 93 which is wound on a drum 94. This drum is rotatably mounted on a shaft 95 which has bearings in brackets 96 and 97 (Fig. 4). Secured to the drum 94 is one member 98 of a cone clutch the other member 99 being slidably, but not rotatably mounted on the shaft 95. The clutch member 99 is moved longitudinally on the shaft 95 by means of an arm 101, which is pivoted at 102 and to the lower end of which is attached the core 100 of a solenoid 103. A tension spring 104 is attached to the lower end of the arm 101 and tends to hold the clutch members 98 and 99 in engagement. Secured to the shaft 95 is a worm wheel 105 which meshes with a worm gear 106 mounted on the shaft of a self-starting synchronous motor 107 (Fig. 2). The motor 107 is connected in a circuit including the A. C. source 82 and the contacts 74. The winding of the solenoid 103 is connected in a circuit including a battery 108 and the contacts 72.

The camera 56 is provided with a shutter mechanism 109 which is connected in a circuit including a battery 110 and the contacts 73. A film 111 (Fig. 3) is provided which is initially wound on a spool 112 and which passes over a roller 113 and through a processing chamber 114. After leaving the processing chamber 114 the film 111 passes between two rollers 115 and 116 and through a V-shaped slot 117 in a member 118 which is mounted on the side of the cabinet 42. Secured to the shaft of the roller 115 is a worm wheel 121 which meshes with a worm gear 122 mounted on the shaft of a self starting synchronous motor 123. This motor is connected in a circuit including the source of A. C. 82 (Fig. 2) and the two sets of contacts 75 and 76, which are connected in parallel. The camera 56 and feeding mechanism 57 are mounted on a section 125 of the cabinet 42 (Fig. 3) which is hinged at 126 so that the camera may be swung clear of the cabinet 42 for purposes of replacing the film 111 or obtaining access to the processing chamber 114.

*Operation*

Normally the transmitting system shown in Fig. 1 is used for transmitting standard types of telecasts from either studio 13 or 14 in a well known manner. In either case the indicator 31 on the control console 12 is turned to position 1 or 2. Under these conditions the telecasts are picked up by the receiver 41, Fig. 2, which operates the kinescope 45 and loud speaker 44 in the usual manner to produce the television image on the screen of the kinescope 45 and the audio signal in the loud speaker 44.

When it is desired to send a news flash the news sheet 35 is placed in position in front of the television camera 24 and the control generator 23 is started. At the time when it is desired to send the news the indicator 31 is turned to the "News" position as shown in Fig. 1. This closes a circuit from the A. C. source 29 to the synchronous motor 26 which starts rotating the commutator 27 in a clockwise direction as indicated by the arrow. As the commutator 27 rotates the segment 28 will engage the contacts 32 thus causing the control generator 23 to send out a distinctive signal over the audio channels 37 and 16 to the transmitter 11 which sends it as a radio signal.

This distinctive audio signal is picked up by the receiving circuits 43, Fig. 2, and passes to the control mechanism 51 over circuits 47 and 49. The circuits of the control mechanism 51 are arranged to be responsive to this particular type of signal. After a predetermined time interval depending upon the characteristics of the audio circuits a control signal will be sent over the circuit 61 which will energize the relay 52, thus closing the circuit through the solenoid 77.

The energization of the solenoid 77 will cause the core 78 to be moved out of engagement with the pin 71 thus allowing the commutator 68 to start rotating in the direction of the arrow under the action of the synchronous motor 67. As soon as the commutator 68 starts to rotate the segment 69 will engage the contacts 72 thus closing a circuit from the battery 108 through the solenoid 103 which causes the core 100 to be moved to the right. This action will cause the arm 101 to be rotated in a counter-clockwise direction to disengage the clutch member 99 thus freeing the drum 94. The cover 84 and mirror 80 will then be moved into the position shown in dotted lines under the action of the spring 88. The position assumed by the mirror 80 is determined by the location of the pin 91 acting as a stop for the arm 86. In this case it is assumed to make an angle of 45° with the top of the cabinet 42. In this position the light from the screen of the kinescope 45 is reflected by the mirrors 80 and 55 onto the shutter of the camera 56. As the commutator 68 continues to rotate the segment 69 will disengage the contacts 72 thus deenergizing the solenoid 103. This action allows the clutch member 99 to engage the clutch member 98, under the action of the spring 104.

After this operation has taken place the segment 28, Fig. 1, will engage the contacts 33 which causes the video output circuit 36 to operate. This will cause a telecast of the news sheet to be transmitted by the transmitter 11. This telecast will be received by the receiving circuits 43 and will be reproduced on the screen of the kinescope 45 in the usual manner. At this instant the commutator 68 will have rotated so that the segment 69 will engage the contacts 73 which will operate the shutter mechanism 109 of the camera 56 to take a picture of the news sheet on the film 111.

As the commutator 68 continues to rotate the segment 69 will engage the contacts 74 thus closing a circuit from the source of A. C. 82 to the synchronous motor 107, which by means of the worm 106 and gear 105 will cause the drum 94 to be rotated in the direction of the arrow. This action will cause the cable 93 to be wound up on the drum 94, thus pulling the cover 84 down into its initial position, as shown in full lines in Fig. 2. After this has been accomplished the segment 69 will move out of engagement with the contacts 74, thus breaking the circuit to the motor 107.

As the commutator 68 continues to rotate the segment 69 will engage the contacts 75, thus closing a circuit from the A. C. source 82 to the synchronous motor 123 (Fig. 3) which by means of the worm 122 and the gear 121 causes the roller 115 to turn in the direction of the arrow. This will cause the exposed portion of the film 111 to be drawn into the processing chamber 114 where it will remain as by this time the segment 69 will have moved out of engagement with the contacts 75.

The film 111 remains in the processing chamber 114 a predetermined time depending on the nature of the process. At the end of this time interval the segment 69 will engage the contacts 76 thus starting the motor 123 which again will rotate the roller 115 in the direction of the arrow to move the exposed and printed film 111 from the processing chamber 114 through the V shaped slot 117 and into the position indicated at 128 from which it may be torn off and used as a news sheet whenever desired.

As the commutator 68 continues to rotate the segment 69 will disconnect the contact 76 thus stopping the motor 123. The commutator 68 will continue its rotation until the pin 71 engages the core 78 of the solenoid 77 when it will be stopped in its initial position. The system will then be in the inoperative condition and will be ready to receive a second telecast of the news at some future time.

If it is desired to use the system for straight television the indicator 31 of the control console 12 is turned to either studio 1 or 2, the receiver 41 is turned on and a regular television program is transmitted and reproduced on the screen of the kinescope 45 in the usual manner.

If a regular television program is in progress and the person viewing the telecast on the screen of the kinescope 45 wishes to take a picture of the action taking place on the screen at that time the rod 64 is depressed closing the circuit of the relay 52 which in turn energizes the solenoid 77 releasing the commutator 68. This starts a sequence of operations similar to that already described causing the cover 84 to open, a picture of the screen to be taken, the cover 84 closed, the picture developed and printed and moved into the position shown at 128 where it may be torn off when desired.

It is thus seen that a system has been developed in which a standard television receiver may be placed on a special cabinet and connected to the mechanism therein by means of a cable. The system can then be operated to receive special news-casts and print the same as news sheets or can be used to take pictures of the television program at any time desired during the reception of the program.

Although only one of the various forms in which this invention may be embodied has been shown herein, it is to be understood that the invention is not limited to any specific construction but might be embodied in various forms without departing from the spirit of the invention or the scope of the appended claims.

What is claimed is:

1. A facsimile printing apparatus for use with a television receiver, said receiver having television receiving means, a signal channel and a kinescope having a screen on which the television picture is viewed, said apparatus comprising a photographic camera, a normally retracted optical system mounted to be shifted to a position to direct the rays from said screen to said camera for photographing thereby onto a sensitized medium in said camera, a processing chamber for said medium, means shifting said optical system to said last position, timed means including control circuits, means for operating said circuits in a timed sequence to first actuate said shifting means to condition said system for photographic recording, then to actuate said camera for photographing the image onto said medium, then to feed said medium to said processing chamber, and finally to remove the processed medium from said chamber, and a control mechanism adapted to be connected to said signal channel and respond to a predetermined received signal to initiate the actuation of said timed means.

2. An apparatus, as set forth in claim 1, in which said optical system comprises a mirror mounted to be shifted to a position to reflect the image of said screen onto said camera.

3. In an apparatus, as set forth in claim 1, a cabinet carrying said camera, processing chamber and timed means, a member on said cabinet carrying a mirror and mounted to be shifted into a position to reflect the image of said screen onto said camera and to be retracted to inoperative position.

4. An apparatus, as set forth in claim 3, in which said member comprises a door normally closing said cabinet and mounted to swing outwardly into the path of the rays from said screen and to expose said camera thereto.

JOHN HAYS HAMMOND, Jr.

REFERENCES CITED

The following references are of record in the file of this patent:

UNITED STATES PATENTS

| Number | Name | Date |
|---|---|---|
| 2,275,898 | Goldsmith | Mar. 10, 1942 |
| 2,294,809 | Smith | Sept. 1, 1942 |
| 2,420,029 | Brady | May 6, 1947 |
| 2,429,921 | Brady | Oct. 28, 1947 |
| 2,504,734 | Schmidling | Apr. 18, 1950 |

FOREIGN PATENTS

| Number | Country | Date |
|---|---|---|
| 355,680 | Great Britain | Nov. 2, 1930 |
| 477,355 | Great Britain | Dec. 28, 1937 |
| 598,491 | Germany | June 21, 1934 |